(12) United States Patent
Jin et al.

(10) Patent No.: US 6,608,897 B1
(45) Date of Patent: Aug. 19, 2003

(54) DOUBLE-TALK INSENSITIVE NLMS ALGORITHM

(75) Inventors: Gary Q. Jin, Kanata (CA); Gordon J. Reesor, Russell (CA); Thomas Qian, Nepean (CA)

(73) Assignee: Zarlink Semiconductor Inc., Kanata (CA)

(*) Notice: Subject to any disclaimer, the term of this patent is extended or adjusted under 35 U.S.C. 154(b) by 0 days.

(21) Appl. No.: 09/175,881

(22) Filed: Oct. 21, 1998

(30) Foreign Application Priority Data

Oct. 24, 1997 (GB) .............................................. 9722443

(51) Int. Cl.[7] .............................................. H04M 1/76
(52) U.S. Cl. .............................. 379/406.09; 379/406.01
(58) Field of Search ................... 379/406.01, 406.02, 379/406.03, 406.04, 406.05, 406.06, 406.07, 406.08, 406.09

(56) References Cited

U.S. PATENT DOCUMENTS

| 5,193,112 A | 3/1993 | Sano | 379/410 |
| 5,263,020 A | * 11/1993 | Yatsuzuka et al. | 379/406.05 |
| 5,323,459 A | 6/1994 | Hirano | 379/391 |
| 5,384,843 A | 1/1995 | Masuda et al. | 379/391 |
| 5,463,618 A | 10/1995 | Furukawa et al. | 370/32.1 |
| 6,185,300 B1 | * 2/2001 | Romesburg | 379/406.09 |

FOREIGN PATENT DOCUMENTS

| EP | 0 627 840 A2 | 3/1994 |

* cited by examiner

*Primary Examiner*—Forester W. Isen
*Assistant Examiner*—Jefferey Harold
(74) *Attorney, Agent, or Firm*—Marks & Clerk

(57) ABSTRACT

A method of canceling echo signals in a telephone network operating in a double talk mode has been developed. A system for implementing the method is also presented. In the invention the conventional normalized least mean square (NLMS) algorithm for echo cancellers is modified such that echo path changes continue to be tracked even after a double talk condition has been detected. The modified algorithm, known herein as a double-talk normalized least mean square (DNLMS) algorithm adaptively adjusts the convergence rate based on the power difference between the echo signal or the residual signal and the far end signal.

10 Claims, 2 Drawing Sheets

DOUBLE-TALK INSENSITIVE NLMS ALGORITHM

FIELD OF INVENTION

This invention relates to echo cancellers for telephones and conferencing terminals and more particularly to a method of controlling echo cancellation in a double talk environment.

BACKGROUND

In a telephone system it is known that incoming signals at the receiver of the terminal are frequently detected by the same terminal's microphone and, if not cancelled, the signal are re-transmitted on the transmit path to a far-end user. Such signals are known as echo signals and can be extremely annoying to telephone users.

Known echo cancellation processes rely on a process involving a Normalized Least-Mean Square (NLMS) algorithm. This algorithm is effective against echo signals that occur when the near-end user is not speaking. There are, of course occasions when the near-end user will choose to talk at the same time as the far-end user. This situation wherein the parties on opposite ends of the telephone line are talking at the same time is known as double-talk. During double-talk, the aforementioned NLMS algorithm tends to become unstable. In order to overcome this instability the known echo canceller products stop or at least slow down the adaptation process as soon as a double-talk condition is detected. However, this scheme cannot prevent the adaptive weights from diverging in the time interval immediately before the double-talk condition has been detected. In a situation where the double-talk is so weak that the double-talk detector cannot detect it, the divergence of the NLMS algorithm becomes even more serious. Also, if the echo path changes during the double talk condition (which is often the case for the acoustic hands free telephone), the NLMS algorithm cannot make the necessary adjustment because the adaptation is frozen.

As previously discussed an echo in a telephone environment is the phenomenon in which a delayed and distorted version of an original signal is reflected back to the source. In the telephone system, this echo causes impairment on the fidelity of the speech signals and is often detrimental to the users. The purpose of the echo canceller is to estimate the echo path relative to the reference signal, reproduce the echo replica and subtract it from the input signal (see FIG. 1).

Currently, the most commonly used echo cancellation algorithm is the NLMS algorithm, which is described as follows: Let r(n) be the far-end speech and s(n) be the near-end speech at the microphone input. The echo signal se (n) can be modeled as:

$$s_e(n)=h(n)*r(n) \quad (1)$$

where h(n) is the unknown echo path, * is the linear convolution operator.
The microphone input signal is $$s_{in}(n)=s_e(n)+s(n)+v(n) \quad (2)$$

where v(n) is the background noise. To eliminate the echo signal $s_e(n)$, the typical NLMS algorithm first estimates the echo path ĥ(n) with the reference signal r(n) and $s_{in}(n)$, and subtracts the echo replica ĥ(n)*r(n) from $s_{in}(n)$ to cancel the echo. With the NLMS algorithm it is possible to estimate ĥ(n) recursively such that at time m:

$$\hat{h}(n) = \hat{h}(n) + \frac{\mu e(m)r(m-n)}{E_r}, n = 0, 1, \ldots, N-1 \quad (3)$$

where N is the length of ĥ(n), and $0<\mu<2$ is the step size which controls the convergence rate of the NLMS algorithm and its final residual error:

$$e(n)=s_{in}(n)-h(n)*r(n)$$

$E_r$ is the energy of the reference signal:

$$E_r = \sum_{n=0}^{N-1} r^2(m-n) \quad (4)$$

The advantages of the NLMS algorithm are that it is simple and easily implemented. When s(n) is absent, ĥ(n) converges to the true echo path h(n). However, when s(n) is present, i.e., when a double-talk situation occurs, the NLMS algorithm will become unstable and quickly diverge from its original state.

SUMMARY OF THE INVENTION

A new double-talk insensitive algorithm known herein as a double-talk normalized least mean square (DNLMS) algorithm is developed in this invention. During a double-talk condition, the DNLMS algorithm can not only stabilize its weights but also track echo path variations.

According to this invention, the NLMS algorithm is modified so that it will be stabilized during the double-talk environment. The new DNLMS algorithm is one in which the convergence rate $\mu$ is adaptively adjusted based on the double-talk condition, i.e., the power difference between $s_{in}(n)$ and r(n). Unlike most telephone echo cancellers where a double-talk detector is added and the adaptation is stopped as soon as a double-talk is detected, the DNLMS algorithm continues to track the echo path change during double-talk, and its cost to implement is even lower than a simple double-talk detector.

Therefore in accordance with a first aspect of the present invention there is provided in a telephone system having a receive path for receiving signals from a far end user and a transmit path for transmitting near end signals to a far end user, a method of controlling an acoustical echo canceller to cancel echo components based on the far end signal from the near end signal in a double talk condition, the method comprising: generating a replica echo signal based on the far end signal and an estimated echo path length; and controllably canceling the replica echo signal from the near end signal using an adaptively adjusted convergence rate.

In accordance with a further aspect of the present invention there is provided a method of controlling an acoustical echo canceller in a telephone system to cancel echo signals from near end signals in a double talk condition, the method comprising the steps of: measuring the relative strengths of the echo signal and the near end signal; canceling the echo signal by controlling convergence rate; and adaptively adjusting the convergence rate based on the relative strengths of said echo signals and said near end signals.

In accordance with a still further aspect of the present invention there is provided in a telephone network having a receive path for receiving signals from a far end user and a transmit path for transmitting near end signals to a far end user, an acoustical echo canceller for canceling echo components of the far end signal from the near end signal in a double talk condition, the echo canceller comprising: means to calculate the relative strengths of the echo components and the near end signal; convergence means to converge the echo components; and means to adaptively adjust the convergence rate based on the relative strengths of the echo components and the near end signal.

BRIEF DESCRIPTION OF THE DRAWINGS

The invention will now be described in greater detail having reference to the attached drawings wherein.

DETAILED DESCRIPTION OF THE INVENTION

In view of the aforementioned double-talk situation most echo canceller products include a double-talk detector. When a double-talk condition is detected, the adaptation procedure is stopped and all the estimated echo weights are frozen until the double-talk condition is released. As for the double-talk detector, it uses either an energy calculation or a correlation calculation. However, because of the strong correlation in speech signals known double talk detectors have difficulty distinguishing between double-talk and echo path changes. Also, almost all double-talk detectors require an averaging time. Before a double-talk is detected, the double-talk signal may have already caused the NLMS algorithm to diverge somewhat. The problem is even worse when the far-end speech starts to quiet down. Under such circumstances, the energy level of the far-end speech ($E_r$) is very small and the residual error signal e(n) is very large, and a big misadjustment is made in the echo path estimation of Eq. (3) before the double-talk is detected. Small undetectable double-talk levels may also cause the divergence of the adaptive filter.

Some other algorithms suggest the use of two sets of adaptive filters to distinguish the double-talk and the echo path changes. However, the cost is dramatically increased especially when the echo path is long.

In a hands-free telephone terminal, the echo environment keeps changing because of the movement of speakers and the change of the acoustic environment. If the estimated echo weights are frozen during the double-talk, all weights must go through a reconverge procedure after the double-talk is released. Therefore, an algorithm is required whereby not only are the adaptive weights kept stable during the double-talk but changes in the echo path are tracked.

In the NLMS algorithm, $\mu$ is the key factor which controls the convergence rate and the final echo residual error. It is known that in order to guarantee the convergence of the NLMS algorithm, $\mu$ is typically in the range of 0 to 2. With a large A, there is a fast convergence rate for NLMS but the final residual error will be large. When the near-end speech is present, the adaptive weights start to diverge. This is the reason why a divergence is observed during a double-talk situation. The divergence problem becomes even more serious when the near-end signal and the far-end signal are highly correlated, (which typically is the case for speech signals). With a small $\mu$, we have a small residual error and if the near-end signal and the far-end signal are uncorrelated in a large time window, the NLMS may still converge to its correct weights. However, the initial convergence rate is very slow with a small $\mu$, and if the convergence is too slow, the NLMS may never converge in an acoustical environment where the environment noise is high and the echo path keeps changing. It is required that the convergence rate is at least faster than the echo path change.

Figure 1:
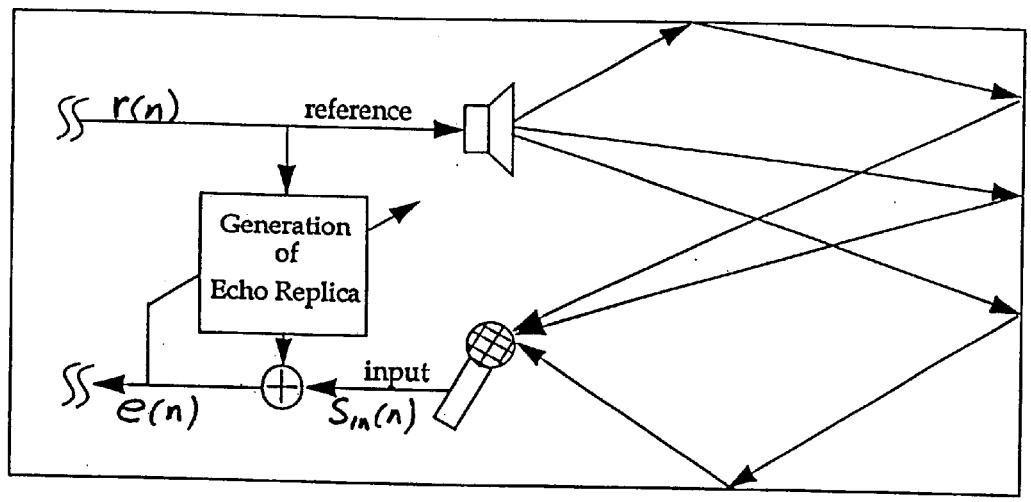
FIG. 1 illustrates an echo generation model in a telephone network.
Figure 2:
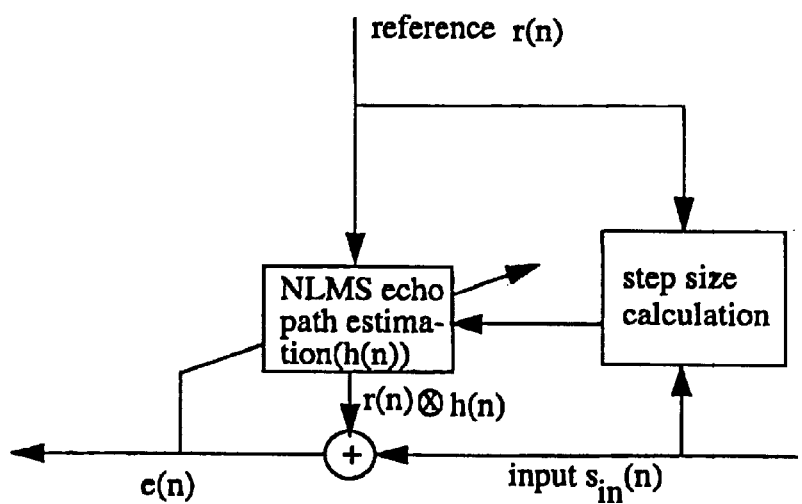
FIG. 2 illustrates the echo replica generation block according to the present invention.

In the present invention, the $\mu$ value is adjusted according to the instantaneous double-talk level. FIG. 2 shows the echo replication block according to the present invention. As shown the convergence rate is adaptively adjusted according to step size $\mu$ calculated in the echo areplica block. During the single-talk mode, $\mu$ is given its largest value and during the double talk, $\mu$ is reduced based on how strong the double-talk is. If the far-end signal is absent, $\mu$ is reduced to zero and no weights adjustment is made. In the DNLMS algorithm, the $\mu$ value is indirectly controlled through $E_r$, the denominator in the second term of Eq. (3). The new weights adaptation follows the following formula:

$$\hat{h}(n) = \hat{h}(n) + \frac{\mu e(m) r(m-n)}{E}, k = 0, 1, \ldots, N-1 \quad (5)$$

If $E=E_r$, it is the normal NLMS algorithm, and if $E>E_r$, it is equivalent to the reduction of $\mu$.

In a real time implementation, the $E_r$ calculation in Eq. (4) can be equivalently replaced by the following recursive algorithm:

$$E_r = \left(1 - \frac{1}{N}\right) E_r + r^2(n) \quad (6)$$

In the DNLMS, we also need to calculate the energy of the near-end speech $E_{in}$:

$$E_{in} = \left(1 - \frac{1}{N}\right) E_{in} + s_{in}^2(n) \quad (7)$$

With $E_r$, and $E_{in}$, the E is calculated as:

$$E = \begin{cases} E_r, & \text{if } E_r > \alpha E_{in} \\ \beta E_{in}, & \text{Otherwise.} \end{cases} \quad (8)$$

Where:
$\alpha > 1$, and $\beta > \alpha$

During the single-talk mode, $E_{in}$, is the echo energy and if it is $\alpha$ times lower than $E_r$, we have $E=E_r$ and it is the normal NLMS algorithm. During double talk, when $E_{in}$, (echo+near-end speech) is larger than $E_r/\alpha$, we have:

$$E = \beta E_{in} = \frac{\beta}{\alpha} \cdot \alpha E_{in} > \frac{\beta}{\alpha} \cdot \alpha E_r.$$

This is equivalent to saying that $\mu$ is reduced at least by $\beta/\alpha$ times:

$$\frac{\mu}{E} < \frac{\alpha}{\beta} \cdot \frac{\mu}{E_r}$$

Figure 3:
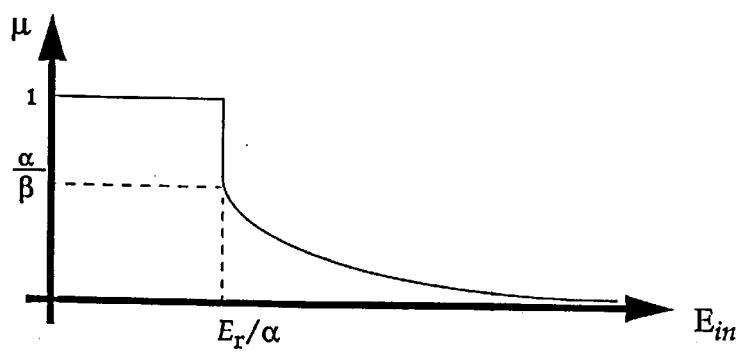
FIG. 3 shows adaptation step size ($\mu$) as a function of near end signal strength with fixed far end signal strength.

Note that $\mu$ is actually reduced inversely proportionally to $E_{in}$, so that increasing near end speech activity also reduces the $\mu$ value. The relationship between the step size $\mu$ and $E_{in}$ is shown in FIG. 3 with a fixed $E_r$, where the initial value of $\mu$ is 1.

In this new scheme, the adaptation continues during the double-talk and $\mu$ is adjusted according to the double-talk strength. All speech signals have voice sections, unvoiced sections and silent periods. During double talk, the active periods of the near-end speech and the far-end speech do not always overlap with each other. The $\mu$ value varies with the difference between the energy levels of the far-end speech ($E_r$) and the near-end speech ($E_{in}$). When the near-end double-talk is strong, a small $\mu$ maintains a slow divergence of the weights and when the far-end speech is strong, a large $\mu$ yields a fast convergence rate. Therefore, the DNLMS can maintain the double-talk stability and track the echo path change during the double-talk, and it converges well even if the near-end signals are dual tone multiple frequency (DTMF) tone signals which have on and off periods.

Figure 4:
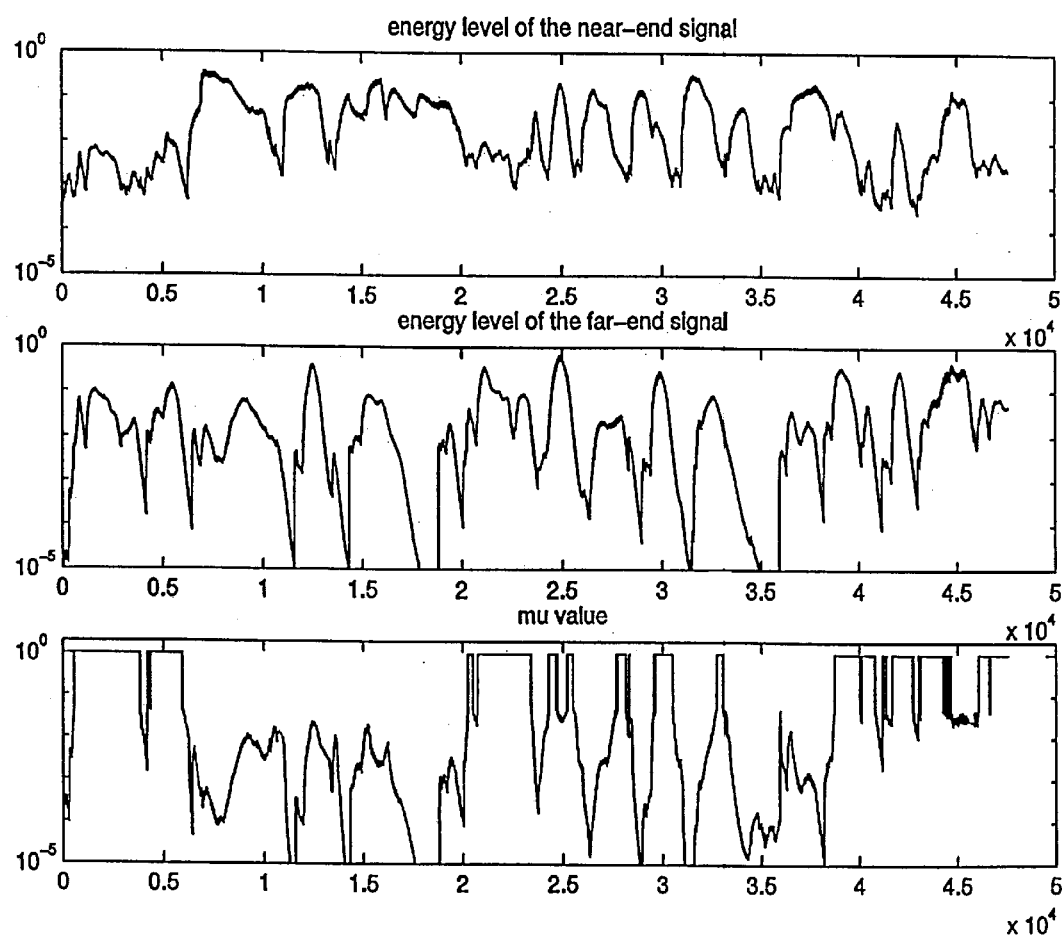
FIG. 4 illustrates graphically the relationship between step size ($\mu$) and relative strengths of near and far end signals.

An example of how $\mu$ varies with the near end and the far end signal levels is shown in FIG. 4. It can be observed that $\mu$ is high at optimum times and no double-talk hang-over time is needed to prevent the divergence during the tails of near-end speech.

There are other ways to calculate the value E beside Eq. (8). The instantaneous energy $E_e$ of residual error e(n) can be used instead of that of $E_{in}$, i.e., $$E_e = \left(1 - \frac{1}{N}\right) E_e + e^2(n) \tag{9}$$

If $E_e$ is used instead of $E_{in}$, in Eq. (8), $\alpha$ can be chosen to be a large number during the single-talk because $E_e$ is the echo residual energy which is much smaller than $E_{in}$. With the large $\alpha$ value, DNLMS will be more sensitive to the double-talk. As soon as the double-talk happens, $\alpha E_e$ will be larger than $E_r$ and $\mu$ is reduced instantaneously. This will make the adaptation more stable during the double-talk. The problem of using $E_e$ is that during the initial convergence period and when the echo path changes, $\alpha E_e$ will be larger than $E_r$ even during the single-talk mode. As a result, large $\alpha$ value may cause the slow convergence rate with a small $\mu$ value. But smaller $\alpha$ is required for the initial convergence.

Another scheme is to choose the minimum value between $\alpha_1 E_{in}$ and $\alpha_2 E_e$ ($\alpha_1 > 0$, $\alpha_2 > \alpha_1$), and E can be calculated in the following two steps:

$$E_1 = \begin{cases} \alpha_2 E_e, & \alpha_1 E_{in} > \alpha_2 E_e \\ \alpha_1 E_{in}, & \alpha_1 E_{in} < \alpha_2 E_e \end{cases} \tag{10}$$

and $$E = \begin{cases} E_r, & \text{if } E_r > E_1 \\ \beta E_1, & \text{Otherwise.} \end{cases} \tag{11}$$

Where during the double-talk, $\mu$ is reduced at least by $\beta$ times $$\frac{\mu}{E} = \frac{\mu}{\beta E_1} < \frac{\mu}{\beta E_r}$$

With a careful choice of $\alpha_1$ and $\alpha_2$, $E_1 = \alpha_1 E_{in}$ is used during the initial convergence period and when the echo path changes ($E_e$ is large). $E_1 = \alpha_2 E_e$ is used when the DNLMS is well converged. This last scheme takes the advantages of both the first scheme and the second one, i.e., sensitive to the double-talk when the NLMS is well converged and fast convergence during double-talk and echo path changing. However, it requires extra computations in comparison with the first two schemes.

In specific tests for the acoustic echo canceller it was found that the following parameters for $\alpha$ and $\beta$ are appropriate for common room environments:

Scheme 1 (using $E_r$ and $E_{in}$): The initial value of $\mu$ is set at 1. It was determined that the echo return loss is at least 6 dB and $\alpha$ was set: $\alpha = 5$. $\beta$ is chosen as 50 such that the $\mu$ is reduced at least 10 times during the double-talk.

Scheme 2 (using $E_r$ and $E_e$): The initial value of $\mu$ is still set at 1. $\alpha$ is chosen as 50 under the condition that the echo return loss is at least 6 dB and the NLMS gives at least 10 dB echo suppression. Again the $\mu$ is reduced at least 10 times during the double-talk and $\beta$ is chosen as 500.

Scheme 3 (using $E_r$ and $E_e$): The initial value of $\mu$ is still set at 1 and the other parameters are chosen as $\alpha_1 = 5$, $\alpha_2 = 50$ and $\beta = 10$. All these are based on the same assumptions and requirements: the echo return loss is at least 6 dB, the NLMS gives at least 10 dB echo suppression, and the value of $\mu$ is reduced at least 10 times during the double-talk.

In all the above parameter selections, it is assumed that the echo return loss is at least 6 dB. This means that with those parameters, the best echo suppression can be achieved for the echo return loss around 6 to 20 dB (which includes most practical environments). However, the situation when echo path has up to 6 dB gain can also be handled with those parameters.

Test results show that during a double talk condition, adaptation weights are stabilized and echo path changes can be tracked. It was found that all the three E-calculation schemes perform similarly and the preference will depend on the environment: echo delay, echo loss and the possible double-talk strength.

In accordance with the present invention the following aspects are obtained:

a). A double-talk insensitive and stabilized NLMS algorithm is developed.

b). The echo path can be tracked during the double-talk with no extra cost.

c). The adaptation weights do not need to be frozen during the double-talk.

d). The adaptation step is adaptively adjusted based on the double-talk strength.

While certain embodiments of the invention have been described and illustrated it will be apparent to one skilled in the art that other variations and alternatives can be made without departing from the basic concept. It is to be understood that such alternatives and variations will fall within the full scope of the invention as defined by the appended claims.

What is claimed is:

1. A method of controlling an acoustical echo canceller in a telephone system to cancel echo signals from near end signals in a double talk condition wherein said echo signal comprises a reflected far end signal, the acoustical echo canceller implementing a double-talk normalized least mean square (DNLMS) algorithm and having means to converge said DNLMS algorithm, the method comprising generating a replica echo signal based on said far end signal and an estimated echo path length; subtracting said replica echo signal from said near end signal by adjusting convergence rate of said DNLMS algorithm; wherein the convergence rate is adaptively adjusted based on the relative strengths of said echo signals and said near end signals, and wherein the convergence rate is based on a variable step size in which the step size is reduced inversely proportional to the power level of the near end signal.

2. The method as defined in claim 1 wherein said step size ($\mu$) is adjusted in accordance with an instantaneous double-talk level.

3. The method as defined in claim 1 wherein convergence adjustment continues in a double-talk mode.

4. The method as defined in claim 1 wherein convergence rate adjustment tracks a change in said echo path length.

5. The method as defined in claim 1 wherein said convergence rate is adjusted faster than an echo path change.

6. A method of controlling an acoustical echo canceller in a telephone system to cancel echo signals from near end signals in a double talk condition wherein said echo signal comprises a reflected far end signal, the acoustical echo canceller implementing a double-talk normalized least mean square (DNLMS) algorithm and having means to converge said DNLMS algorithm the method comprising generating a replica echo signal based on said far end signal and an estimated echo path length; subtracting said replica echo signal from said near end signal by adjusting convergence rate of said DNLMS algorithm; wherein the convergence rate is adaptively adjusted based on the relative strengths of said echo signals and said near end signals and, wherein the convergence rate is based on a variable step size in which the step size value is controlled through the energy level of the far end signal.

7. The method as defined in claim 6 wherein said step size ($\mu$) is adjusted in accordance with an instantaneous double-talk level.

8. The method as defined in claim 6 wherein convergence adjustment continues in a double-talk mode.

9. The method as defined in claim 6 wherein convergence rate adjustment tracks a change in said echo path length.

10. The method as defined in claim 6 wherein said convergence rate is adjusted faster than an each path change.

* * * * *